(12) United States Patent
Boberg et al.

(10) Patent No.: US 8,719,906 B2
(45) Date of Patent: May 6, 2014

(54) REACTIVE AUTHORIZATION FOR PUBLICATIONS

(75) Inventors: Christer Boberg, Tungelsta (SE); David Cox, Melbourne (AU); Mikael Klein, Huddinge (SE); Sofie Lassborn, Sollentuna (SE); Anders Lindgren, Älvsjö (SE)

(73) Assignee: Optis Wireless Technology, LLC, Plano, TX (US)

( * ) Notice: Subject to any disclaimer, the term of this patent is extended or adjusted under 35 U.S.C. 154(b) by 130 days.

(21) Appl. No.: 13/321,593

(22) PCT Filed: May 28, 2009

(86) PCT No.: PCT/IB2009/005754
§ 371 (c)(1),
(2), (4) Date: Dec. 16, 2011

(87) PCT Pub. No.: WO2010/136835
PCT Pub. Date: Dec. 2, 2010

(65) Prior Publication Data
US 2012/0124650 A1    May 17, 2012

(51) Int. Cl.
*H04L 29/06* (2006.01)
*G06F 21/62* (2013.01)

(52) U.S. Cl.
CPC ........ *G06F 21/6245* (2013.01); *G06F 21/6272* (2013.01)
USPC ............ 726/4; 726/5; 726/6; 726/7; 713/168; 713/169; 713/170; 713/171; 713/172

(58) Field of Classification Search
CPC .................................................. G06F 21/6245
USPC ............................................................. 726/4
See application file for complete search history.

(56) References Cited

U.S. PATENT DOCUMENTS

| | | | | |
|---|---|---|---|---|
| 6,209,100 | B1 * | 3/2001 | Robertson et al. | 726/2 |
| 7,376,832 | B2 * | 5/2008 | Diep et al. | 713/155 |
| 2007/0168424 | A1 * | 7/2007 | Oh et al. | 709/204 |
| 2008/0010301 | A1 * | 1/2008 | Tian et al. | 707/10 |
| 2008/0126360 | A1 | 5/2008 | Kakuta et al. | |

OTHER PUBLICATIONS

International Search Report and Written Opinion in corresponding International Application No. PCT//IB2009/005754, mailed Jul. 9, 2010.
Open Mobile Alliance: "Presence Simple Specification, Candidate Version 2.0", OMA-TS-Presence_SIMPLE-V2_0-20081223-C, Dec. 23, 2008, XPOO2588931, entire document.

* cited by examiner

*Primary Examiner* — Longbit Chai
(74) *Attorney, Agent, or Firm* — Vincent J. Allen; Carstens & Cahoon, LLP

(57) ABSTRACT

Systems and methods for reactively authorizing publication of information by a third party are coordinated through the use of a presence server. The presence server communicates with other communication nodes/devices to determine and relay publication information. Publication requests that are initially unauthorized, from the perspective of the presence server, are resolved.

22 Claims, 13 Drawing Sheets

REACTIVE AUTHORIZATION FOR PUBLICATIONS

TECHNICAL FIELD

The present invention relates generally to communications and in particular to methods, devices and systems involving presence technologies.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc., also allow the users to communicate via e-mail, video conferencing, IM, and the like. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases.

Many communication applications allow for real-time or near real-time communication that falls outside of the traditional voice communication associated with wireline and wireless telephone communications. Chat session, instant messaging, Short Message Service (SMS), video conferencing, are a few such communication vehicles. Many of these types of communications are expected to become increasingly popular, particularly in view of the proliferation of wireless devices and continual technological breakthroughs in this area.

One method for facilitating the above mentioned communication vehicles is the so-called "presence" technology Presence technology can be used to determine the location, willingness to communicate, publishing information, and other parameters relating to real-time or near real-time communications. The presence technology generally refers to applications and services that facilitate location and identification of one or more endpoints to such communication links. For example, if a first user of a wireless, handheld device intends to initiate an IM session with a second IM user, presence services may be used to present the second user's willingness to receive IM messages. Presence services are an integral part of third generation (3G) wireless networks, and are intended to be employed across a wide variety of communication devices, as well as next generation wireless communication systems.

Presence information may be created at a presence server or an associated system. Presence information may be a status indicator that conveys the ability and willingness of a potential user to communicate with other users. The presence server may provide the presence information for distribution to other users (called watchers) to convey the availability of the user for communication. Presence information is used in many communication services, such as IM, and recent implementations of voice over IP (VoIP) communications.

A user client may publish a presence state to indicate its current communication status. This published state informs others that wish to contact the user of his or her availability and willingness to communicate. One use of presence is to display an indicator icon on IM clients, for example a choice of a graphic symbol with an easy-to-convey meaning, and a list of corresponding text descriptions of each of the states. This is similar to the "on-hook" or "off-hook" state of a fixed phone. Common states regarding the user's availability are "free for chat", "busy", etc. Such states exist in many variations across different modern IM clients. However, the standards support a rich choice of additional presence attributes that may be used for presence information, such as user mood, location or free text status.

Different protocols can be used over communications networks which use presence technology to support different presence aspects. For example, in an Internet Protocol Multimedia Subsystem (IMS), Session Initiation Protocol (SIP) can be used to support presence features. More specifically, the SIP Publish mechanism can be used to upload presence information to a presence server. The SIP Publish is normally performed by the "presentity", i.e., the entity owning the data to be published, however in some cases other entities on behalf of the presentity may desire to have the data published. In another example, the Open Mobility Alliance—Presence and Availability Working Group 2.0 (OMA-PAG) allows for the creation of rules for publishers, where the presentity may set rules for who is allowed to publish what data on behalf of the presentity. However, these different systems do not address all features and communication methods that may be desirable for use in these growing networks, e.g., how to publish information based on content or how to deal with unauthorized, third party requests to publish presence data.

Accordingly, systems and methods for the improvement of publishing methods in the context of presence technology are desirable.

SUMMARY

Exemplary embodiments relate to methods for handling publication requests to, e.g., a presence server, especially requests which are currently unauthorized, i.e., for which the presence server has no instructions from the relevant presentity to permit the requested publication at the time the request is received. A number of signaling variations are contemplated to resolve the unauthorized publication request, which signaling variations may require more or less interaction from the requesting publishing entity and/or from the presentity itself. Some potential advantages associated with exemplary embodiments described herein include the provision of a capability, via various methods, for determining which third party (or third parties) are allowed to publish what information on behalf of another user or application.

According to an exemplary embodiment, a method for handling unauthorized requests to publish information associated with a first entity is described. A request is received from a second entity to publish information associated with the first entity. This request is compared to stored authorization information to determine that the request is currently unauthorized. A first authorization response is transmitted toward the second entity, which indicates that the request to publish information is currently unauthorized.

According to another exemplary embodiment, a communications node for handling unauthorized requests to publish information associated with a first entity is described. The communications node includes at least one memory for storing authorization information associated with publication and a communications interface for transmitting and receiving messages. Such messages include a request from a second entity to publish information associated with the first entity. The communications nodes also includes a processor, wherein the processor uses information stored in the memory to execute instructions in response to received messages and is configured to compare the request to the stored authorization information to determine that the request is currently unauthorized. Then, the communications interface also transmits a first authorization response toward the second entity which indicates that the request to publish information is currently unauthorized.

BRIEF DESCRIPTION OF THE DRAWINGS

The accompanying drawings illustrate exemplary embodiments, wherein.

DETAILED DESCRIPTION

Figure 1:
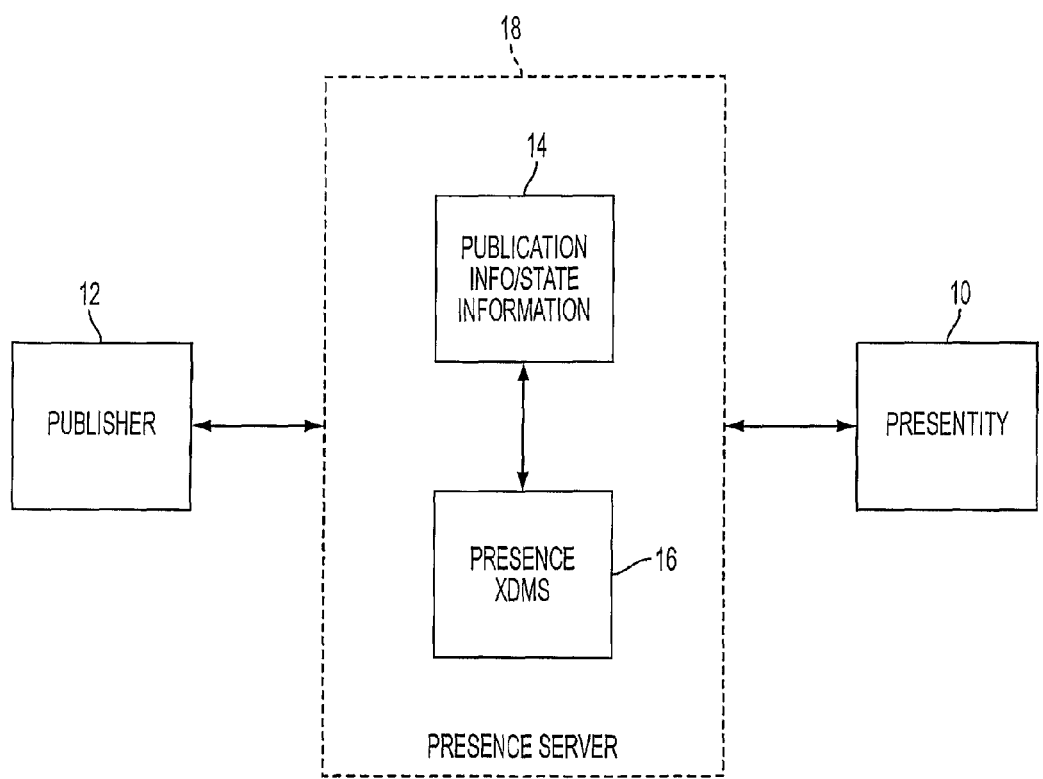
FIG. 1 depicts a communication system that uses presence data according to exemplary embodiments.

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

As telecommunications systems expand and are upgraded, presence information is expected to become more useful in support of an increasing number of applications, which should lead to improvements in presence technologies and to the increased popularity of presence mechanisms with users of such systems becoming more desirable. Prior to discussing the exemplary embodiments below, a purely illustrative communication system in which presence data may be used will now be described with respect to FIG. 1 to provide some context for this discussion.

According to exemplary embodiments, a communication system that uses presence data may include a presentity 10, a publisher 12 and a presence server 18 which includes both a publication information/state information function 14 and a presence eXtensible Markup Language (XML) Data Management System (XDMS) function 16. The presence server 18 can include these two functions, however they may also be implemented as separate servers located at separate physical locations. The presentity 10 can be an agent or function associated with a device, e.g., a mobile phone or computer, which provides presence information, e.g., publishing and subscription rules for information associated with itself. Publisher 12 could be a function associated with another device, e.g., a mobile phone, communications server, etc., which desires to publish information associated with presentity 10. The presence server 18 receives and stores presence information for use by other communication nodes. More specifically, the publication information/state information function 14 stores publishing information and state information for any presentities 10 (or other applicable communication nodes) with which the presence server 18 is in communication. Additionally, the presence XDMS function 16 represents a logical function, e.g., a presence publication authorization (PPA) XDMS function, capable of implementing the set of presence authorization rules, e.g., authentication rules. The presence authorization rules may be stored in the presence XDMS 16 or stored elsewhere as desired, particularly in the cases where protocols other than XML Configuration Access Protocol (XCAP) are used to provide this authorization information. Communications by the presentity 10 and the publisher 12 with the presence server 18 may be wireline or wireless. As used herein (and in the associated Figures), the presence server 18 represents both the publication information/state information function 14 and the presence XDMS function 16 for simplicity, except where expressly stated otherwise and recognizing that these functions may or may not be co-located with one another.

Using the system shown in FIG. 1, various protocols, e.g., Session Initiation Protocol (SIP), can be used to upload presence information to a presence server 18 in various architectures, e.g., Internet Protocol (IP) Multimedia Subsystem. However, this method of publication, by itself, does not address the issues of how to determine in real-time or near real-time what entity(s) are allowed to publish information on behalf of another user, as well as what presence attributes such an entity may publish. Other challenges addressed below by the various exemplary embodiments allow for real-time and near real-time publishing using presence technology to inform the presentity 10 that a user, e.g., publisher 12, is trying to publish information on behalf of the presentity 10, enabling the presentity 10 to allow, block or modify the publishing attempt, and selectively allowing or denying each publication request based upon the content of the publication via instructions to the presence server 18.

As described in the various exemplary embodiments herein, the terms "publishing", "publication" and the like are used generally to describe the act of presenting information, for viewing or use by others, associated with an entity or created by an entity. For example, the publishing of information can include the creation or publication of a Presence Information Data Format (PIDF) document which is used by a presence server to enables others (watchers) to view or be provided with presence information associated with an entity, e.g., whether a cell phone is open for calling. A PIDF document stored by a presence server 18 can, for example, be a composition of multiple PIDF documents which the presence server 18 receives from multiple sources. For example, if a particular presentity 10 is associated with multiple client devices (e.g., a person's home computer, that person's mobile phone and/or that person's work computer), the presence server 18 could receive information from each client which it could combine into a single PIDF document for the presentity 10 for handling presence information for that presentity 10. Additionally, third parties may desire to add data to that presentity 10's PIDF document. Other non-limiting examples of types of data that a third party might wish to publish include location information, blog data, service availability, etc. Also, other formats than PIDF can be used for the viewing of the to be published information.

Thus, according to exemplary embodiments, using the communications system shown in FIG. 1, the presence server 18 can query the presentity 10 in real time, or near real time, to publish information on behalf of the presentity 10, e.g., a reactive authorization for publication of data requested by a third party. The publisher 12 may already be authorized to publish data on behalf of presentity 10, or may be unauthorized. An "unauthorized request" to publish, as used herein, describes a currently unauthorized request to publish due to at least one the following reasons: (1) identity of requesting entity is unknown/unauthorized; (2) the type of content/data to be published is unknown/unauthorized; and/or (3) due to other desired reasons. Exemplary embodiments discussed herein are particularly focused on the handling of publication requests by as-yet unauthorized publishers 12, but are not limited thereto.

For example, there can be an authorization mechanism for publications such that when a publisher 12 (which is not currently listed in the publication authorization document within presence server 18) sends a publication request on behalf of a presentity 10, the presence server 18 can send an authorization request to the presentity 10 to ask for instructions regarding the publisher 12 and/or its publication request. This authorization can include a blanket authorization, a onetime authorization, a partial authorization, an authorization based upon content, a denial or some combination thereof. In addition to the real time and near real time authorization opportunities, authorization instructions can be stored, if applicable, in the presence server 18 for future use.

As described above, there may be times when there are no previously stored authorization rules at a presence server 18 with respect to publishing information associated with a presentity 10 by a third party, or at least with respect to a particular third party which has not previously requested to publish information associated with presentity 10. Various exemplary combinations for solving this problem, as well as their associated signalling, are described in more detail below. In these exemplary embodiments, the presence server 18 receives various type of signals, e.g. SIP signalling, XML data, Hypertext Transport Protocol signalling, etc., and these various types of signals and data are routed within the presence server 18, e.g., to the publication rules/state information function 14 and the XDMS presence function 16, as will be described in more detail herein.

According to exemplary embodiments, signalling and logic used between presentity 10, presence server 18 and publisher 12 to allow real time or near real time response to publishing requests will now be described with respect to the exemplary signalling diagrams shown in FIGS. 2(a)-2(e). In these figures (and the associated text herein) User A and the publisher 12 are considered to refer to the same entity (e.g., a second entity), and User B and the presentity 10 are also considered to refer to the same entity (e.g., a first entity), such that these terms may be used interchangeably or together below. Initially, presentity 10 subscribes to pub-rules information and, optionally, submits publication information, as shown by SIP Subscribe message 202 to the presence server 18. Message 202 instructs presence server 18 to notify presentity 10 when a publish request is received by the presence server 18 that is outside of the currently existing publishing rules, i.e., such that the presentity 10 is informed when an unauthorized publisher desires to publish data for that presentity 10 or when a previously approved publisher requests to publish data that it is not yet allowed to publish by that presentity 10. At some future point in time, publisher 12 sends a SIP Publish message 204, which includes information about User B and data X, Y, which message 204 requests publishing of data X and Y on behalf of User B. Data X and Y can represent different content and/or presence parameters, associated with presentity 10, that publisher 12 desires to publish (or have published). Presence server 18 then reviews its publishing/authorization rules and determines, in this case, that no authorization rule(s) exist for User A publisher 12. Accordingly, a 202 Accepted message 206, including a temporary Entity tag (Etag) which indicates that the request has been accepted but not yet been authorized, is transmitted to publisher 12. Additionally, a retry-after notification may be included in message 206, as a part of the Etag, to inform the publisher 12 that it can retry the publication attempt at a later time. A potential, but purely illustrative, retry time could be five minutes. However, depending upon the type of service, shorter or longer time retry time frames such as one minute, twenty four hours or others could be used.

Additionally, at the same time or about the same time, a SIP Notify message 208 which includes publication notification information is sent to the presentity 10 regarding the publication attempt by User A. In this purely illustrative example, the User B presentity 10 decides to allow the User A publisher 12 to publish only data Y, and sends an XCAP PUT message 210 to the presence server 18 with this information for its use/storage. At some point in the future, based upon when publisher 12 decides to perform a publish retry, publisher 12 transmits another SIP Publish message 212 to the presence server 18. Message 212 can, for example, be sent at a time based upon the retry-after notification received from the presence server 18 in message 206 (if any), at a predetermined time after receipt of message 206 or at another time. Alternatively, message 212 can be a shorter message with an eTag for the publishing request as compared to resubmitting all of the data to be published. Upon receipt of message 212, presence server 18 checks its stored instructions, finds a match between the request and its stored instructions and transmits a 200 OK message 214 back to the publisher 12 which includes the allowed data to be published, in this case, data Y.

Figure 2A:
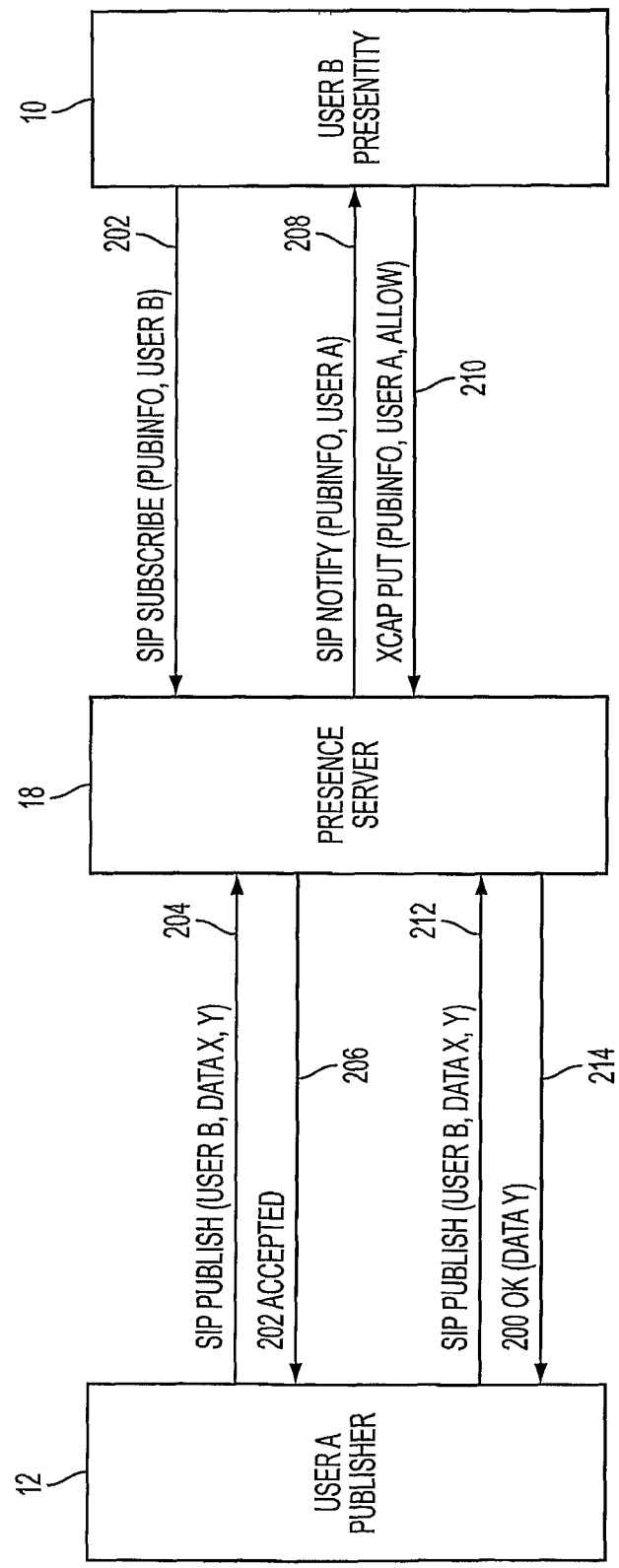
FIGS. 2(a)-2(e) show signalling diagrams for various use cases when a publisher desires to publish information associated with a presentity according to exemplary embodiments.
Figure 2B:
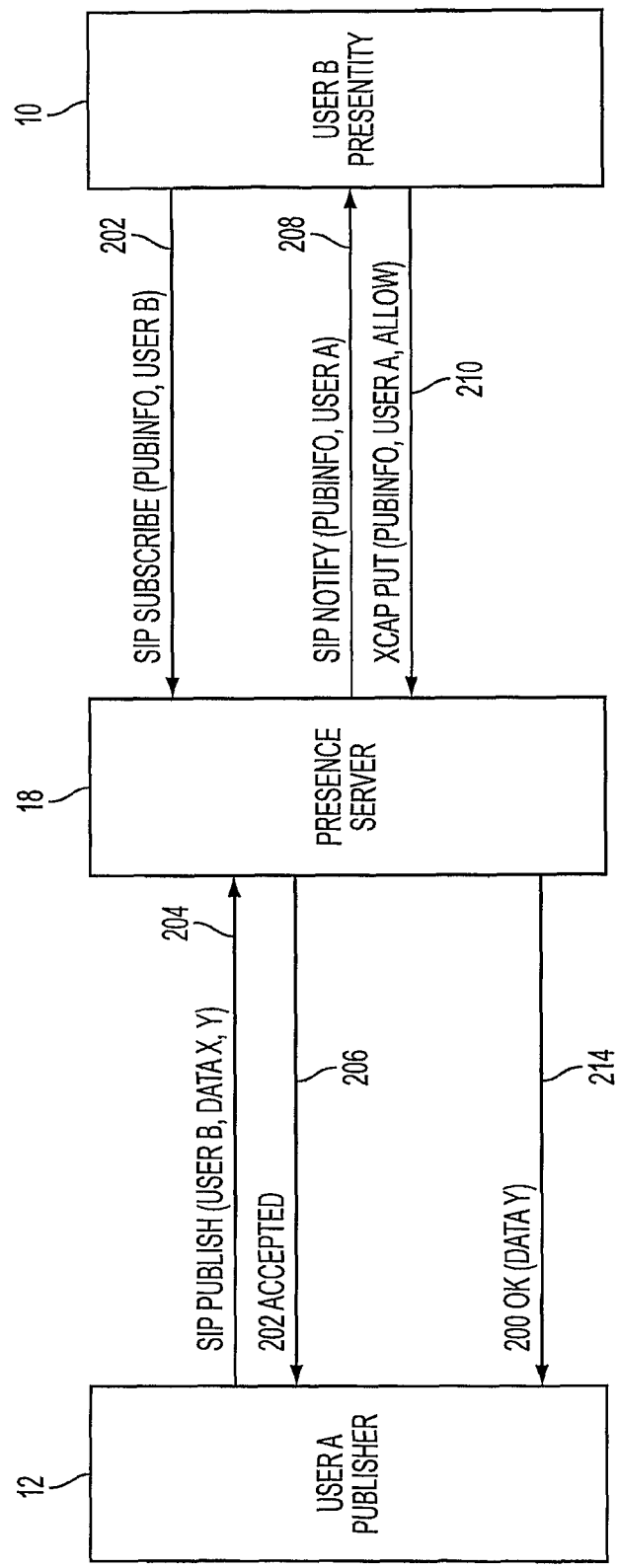

According to another exemplary embodiment, an initially unauthorized publisher 12 can publish information from presentity 10 without sending multiple SIP Publish requests to the presence server 18 as shown in FIG. 2(b). As in the previous example, presentity 10 first subscribes to publication information and potentially submits publication information, as shown by SIP Subscribe message 202, from presentity 10 to the presence server 18. Message 202 provides the presence server 18 with that presentity's authorized publication information and, optionally, with its preferred mechanism for handling unauthorized publishers. At some future point in time, publisher 12 sends a SIP Publish message 204, which includes information about the presentity 10 and data X, Y, requesting publication of data X and Y on behalf of User B. Data X and Y can represent different content, associated with presentity 10, that publisher 12 desires to publish (or have published). Presence server 18 then reviews its publishing/authorization rules and determines, in this case, that no authorization rule(s) exist for User A 12 and a 202 Accepted message 206, including a temporary Entity tag (Etag) which indicates that the request has not yet been authorized, is transmitted to the publisher 12.

Additionally, at or around this time a SIP Notify message 208 which includes publication rules notification information is sent to the presentity 10 regarding the publication attempt. The User B presentity 10 decides to allow the User A publisher 12 to publish only data Y and sends an XCAP PUT message 210 to the presence server 18 with this information for its use/storage. Presence server 18 checks its stored information, and determines that User A publisher 12 is interested in publishing the data that presentity User B 10 has now indicated as allowed to be published by User A publisher 12 and transmits a 200 OK message 214 back to the publisher 12 which includes the allowed data to be published, in this case, data Y.

Figure 2C:
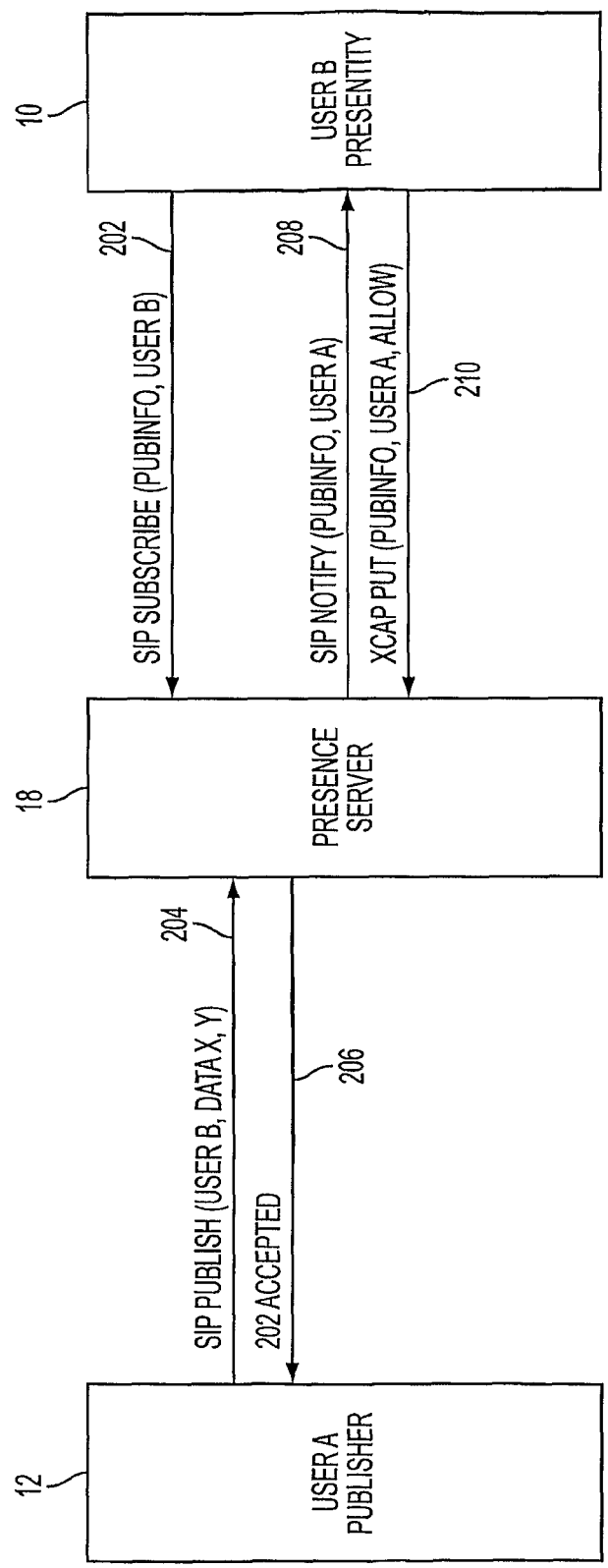

According to another exemplary embodiment, publisher 12 can publish information from presentity 10 without sending multiple SIP Publish requests to the presence server 18 as shown in FIG. 2(c). Moreover, no additional response is sent from the presence server 18 to the publisher 12 to indicate that publication of the previously requested data is now permitted. Initially, presentity 10 subscribes to pub-rules information and potentially submits publication information, as shown by SIP Subscribe message 202 from presentity 10 to the presence server 18, to get information when an unauthorized publisher desires to publish data or when a previously approved publisher publishes data that it is not yet allowed to publish, i.e., this informs presence server 18 to notify presentity 10 when a publish request occurs that is outside of the currently existing publishing rules. At some future point in time, publisher 12 sends a SIP Publish message 204, which includes information about the presentity 10 and data X, Y, to publish data X and Y on behalf of User B. Data X and Y can represent different content, associated with presentity 10, that publisher 12 desires to publish (or have published). Presence server 18 then reviews its publishing/authorization rules and determines, in this case, that no authorization rule(s) exist for publisher User A 12 and a 202 Accepted message 206, including a temporary Entity tag (Etag) which indicates that the request has not yet been authorized is transmitted to publisher 12. Additionally, at this (or another) time a SIP Notify message 208 which includes publication rules notification information is sent to the presentity 10 regarding the publication attempt. The presentity (User B) 10 decides to allow the publisher (User A) 12 to publish only data Y and sends an XCAP PUT message 210 to the presence server 18 with this information for its use/storage. For this exemplary embodiment, the information can be published in various ways. For example, the publication can be automatically activated after the presentity 10 has authorized it, or alternatively, the presence server 18 can wait for another SIP Publish request from the publisher 12 before publishing the information.

Figure 2D:
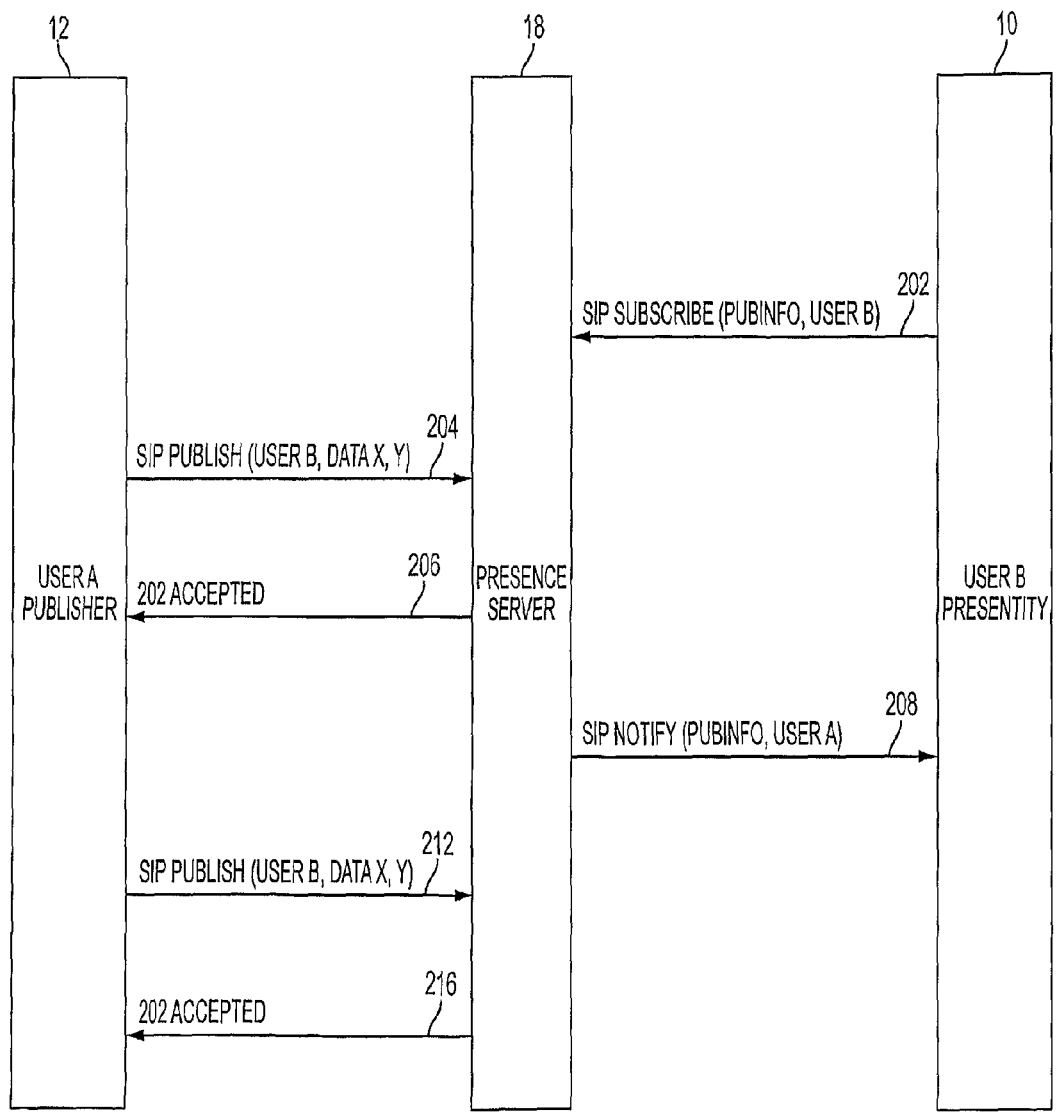

According to another exemplary use case, FIG. 2(d) shows the signalling for the case where the presentity User B 10 fails to respond to a request for publication rules from the presence server 18 with respect to the publish request from the publisher User A 12. Initially, presentity 10 subscribes to publication information and potentially submits publication information, as shown by SIP Subscribe message 202 from presentity 10 to the presence server 18. At some future point in time, publisher 12 sends a SIP Publish message 204, which includes information about the presentity 10 and data X, Y, to publish data X and Y on behalf of User B. Data X and Y can represent different content, associated with presentity 10, that publisher 12 desires to publish (or have published). Presence server 18 then reviews its publishing/authorization rules and determines, in this case, that no authorization rule(s) exist for publisher User A 12. A 202 Accepted message 206, including a temporary Entity tag (Etag) which indicates that the request has not yet been authorized, is then transmitted to publisher 12. Additionally, a retry-after notification may be included in message 206 to inform the publisher 12 that it can retry the publication at a later time. The retry-after notification also serves to notify the publisher 12 to not publish until the stated time has elapsed. Also, according to exemplary embodiments, an eTag can be added, in a separate header, for cases where the publisher 12 has multiple publications to differentiate the publications. In the case of just a single publication associated with publisher 12, the eTag can be omitted.

At (or around) this time a SIP Notify message 208, which includes publication notification information, is sent to the presentity 10 regarding the publication attempt. In this exemplary embodiment, no response is received back at the presence server 18 in a timely fashion. At some time in the future, based upon when publisher 12 decides to perform a publish retry, publisher 12 transmits another SIP Publish message 212 to the presence server 18. Presence server 18 checks its stored instructions, and still does not find a match between the request and its stored rules since the presentity 10 has not yet provided updated publication authorization information. A second 202 Accepted message 216 (potentially with another Etag) is transmitted back to the publisher 12. At this point, the presence server 18 can optionally transmit another message SIP Notify message to the presentity 10, and the publisher 12 can continue to retry and publish via the use of SIP Publish messages to the presence server 18 until authorization or rejection occurs.

Figure 2E:
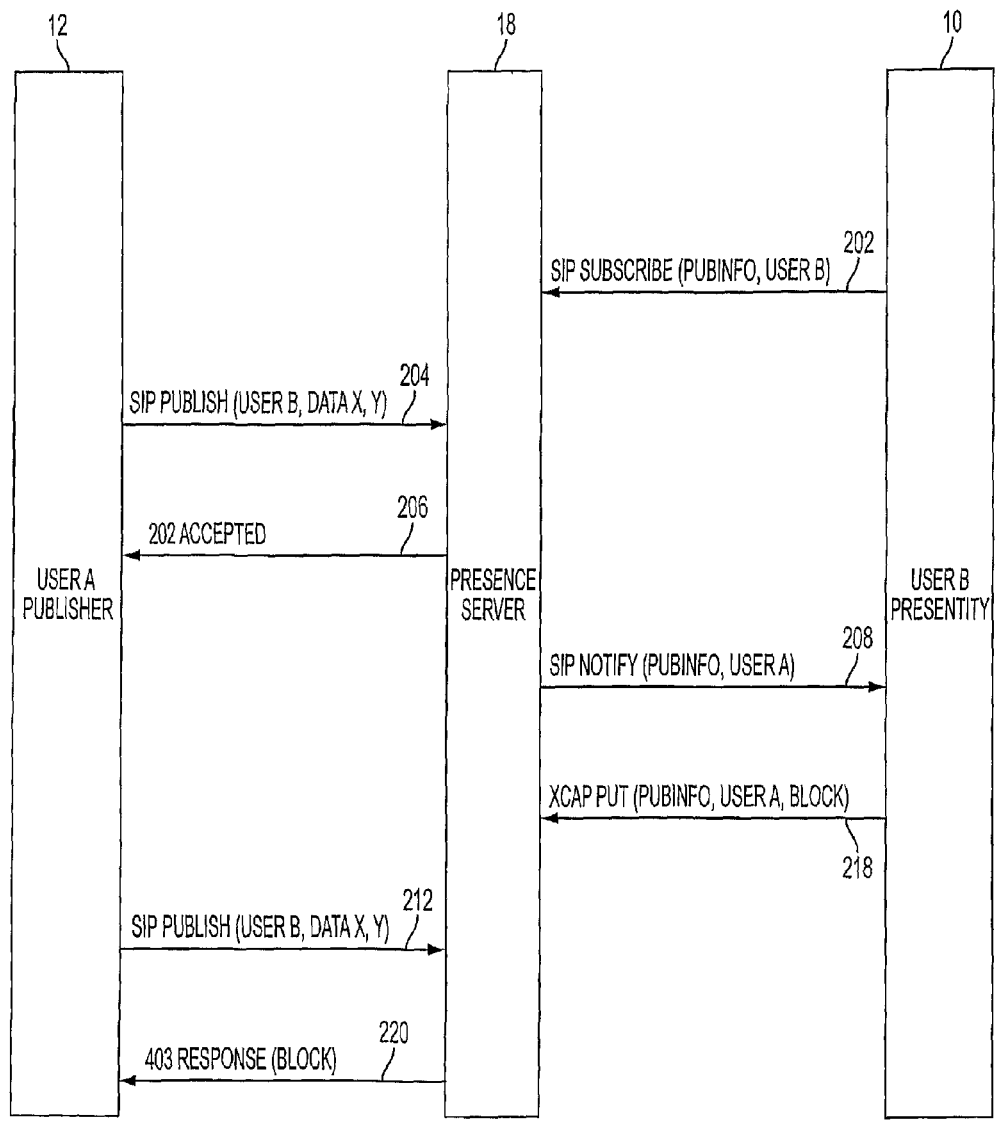

According to another exemplary use case, FIG. 2(e) shows signalling for the case where the presentity User B 10 rejects a request for publication from the presence server 18 with respect to the publish request from the publisher User A 12. Initially, presentity 10 subscribes to publication information and potentially submits publication information, as shown by SIP Subscribe message 202 from presentity 10 to the presence server 18. At some future point in time, publisher 12 sends a SIP Publish message 204, which includes information about the presentity 10 and data X, Y, to publish data X and Y on behalf of User B. Data X and Y can represent different content, associated with presentity 10, that publisher 12 desires to publish (or have published). Presence server 18 then reviews its publishing/authorization rules and determines, in this case, that no authorization rule(s) exist for publisher User A 12 and a 202 Accepted message 206, including a temporary Entity tag (Etag) which indicates that the request has not yet been authorized, is transmitted to publisher 12. Additionally, a retry-after notification may be included in message 206, as a part of the Etag, to inform the publisher 12 that it can retry the publication at a later time.

At (or around) this time a SIP Notify message 208 which includes publication rules notification information is sent to the presentity 10 regarding the publication attempt. The presentity User B 10 decides to block the publisher User A 12 from publishing any data and sends an XCAP PUT message 218 to the presence server 18 with these instructions for its use/storage. At some point in the future, based upon when publisher 12 decides to perform a publish retry, publisher 12 transmits another SIP Publish message 212 to the presence server 18. Presence server 18 checks its stored instructions, finds a match between the request and its stored instructions and transmits a 403 Response (or a 603 Declined response) message back to the publisher 12 which informs the publisher 12 of the block or refusal to allow publisher User A 12 to publish data X and Y.

Figure 3A:
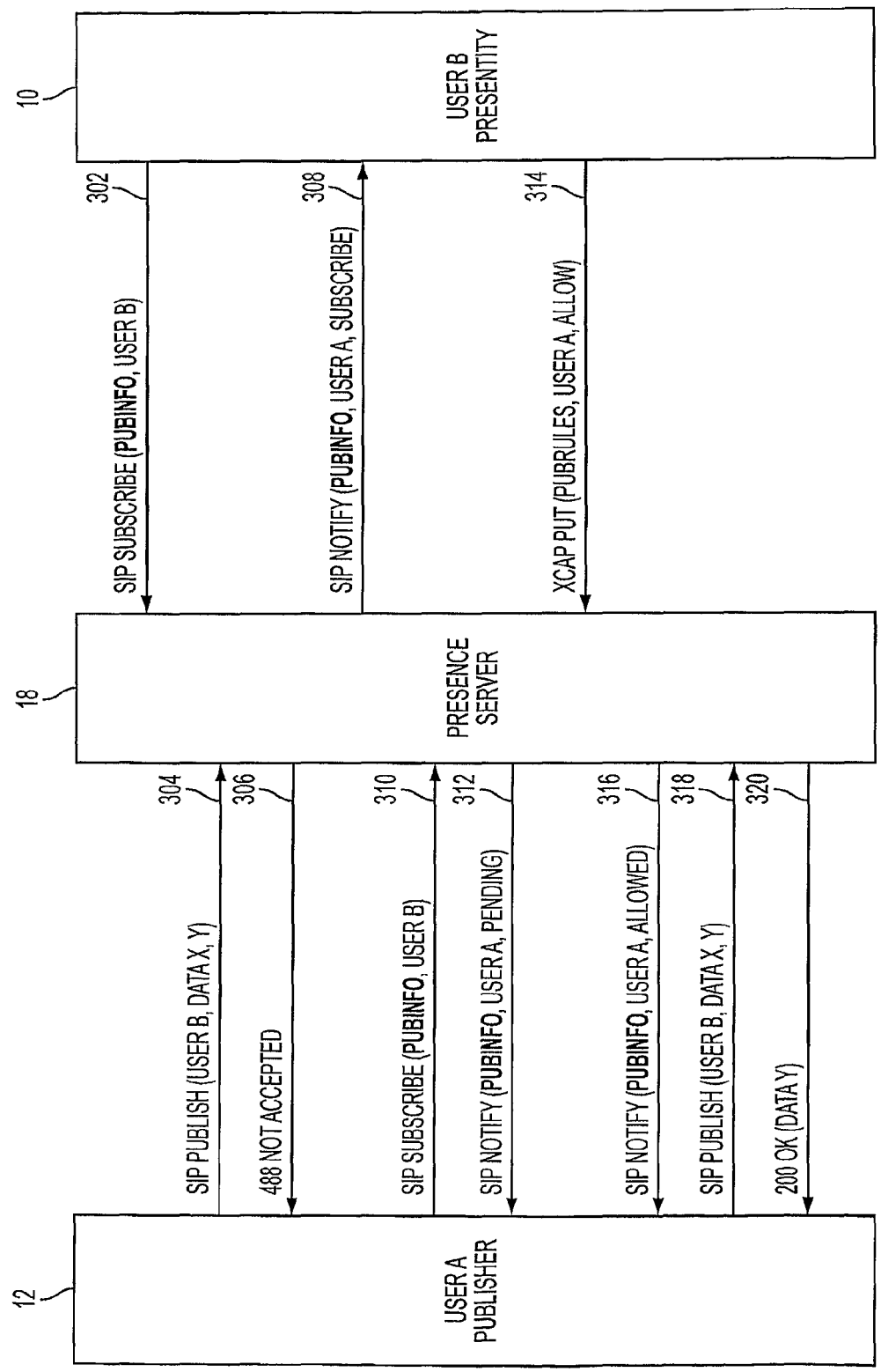
FIGS. 3(a)-3(c) illustrate signalling diagrams for various use cases when a publisher desires to publish information associated with a presentity and subscribes to publication information at a presence server according to exemplary embodiments.

According to exemplary embodiments, alternative signalling and logic used between presentity 10, presence server 18 and publisher 12 wherein the User A Publisher 12 subscribes to pubinfo to allow real-time or near real-time responses to publishing requests will now be described with respect to the exemplary signalling diagrams shown in FIGS. 3(a)-3(c). According to exemplary embodiments, a publisher 12 subscribes to the pubinfo event package to obtain information relating to authorization decisions of the presentity 10 as shown in FIG. 3(a).

Initially, presentity 10 subscribes to publication information and potentially submits publication information, as shown by SIP Subscribe message 302, from presentity 10 to the presence server 18. At some future point in time, publisher 12 sends a SIP Publish message 304, which includes information about the presentity 10 and data X, Y, to publish data X and Y on behalf of User B. Data X and Y can represent different content, associated with presentity 10, that publisher 12 desires to publish (or have published). Presence server 18 then reviews its publishing/authorization rules and determines, in this case, that no authorization rule(s) exist for publisher User A 12 and a message returning a form of a negative response, e.g., 488 Not Accepted message 306, is transmitted back to the publisher 12. It is expected that other types of negative response messages could be used here as desired. Additionally, at (or around) this time a SIP Notify message 308, which includes information associated with pubinfo and User A is transmitted from the presence server 18 to the User B presentity 10.

After receipt of the 488 Not Accepted message 306, the User A publisher 12 transmits a SIP Subscribe message 310 for subscription to the pubinfo stored at the presence server 18, e.g., publication information/state information 14 within the presence server 18, associated with the presentity User B 10. The presence server 18 then transmits a SIP Notify message 312 which includes a publish pending decision to the publisher 12. At some later point in time, the User B presentity 10 transmits an XCAP PUT message 314 which updates the publication rules for User A and the associated request. The presence server 18 can then transmit another SIP Notify message 316 to the publisher 12 which includes information associated with the publication information/state update of presentity 10. The publisher 12 then transmits another SIP Publish message 318, which the presence server 18 compares to its stored publication rules, and responds to the publisher 12 with a 200 OK message 320 with the allowed publication result, in this case, the authorization to publish data Y on behalf of the presentity 10.

Figure 3B:
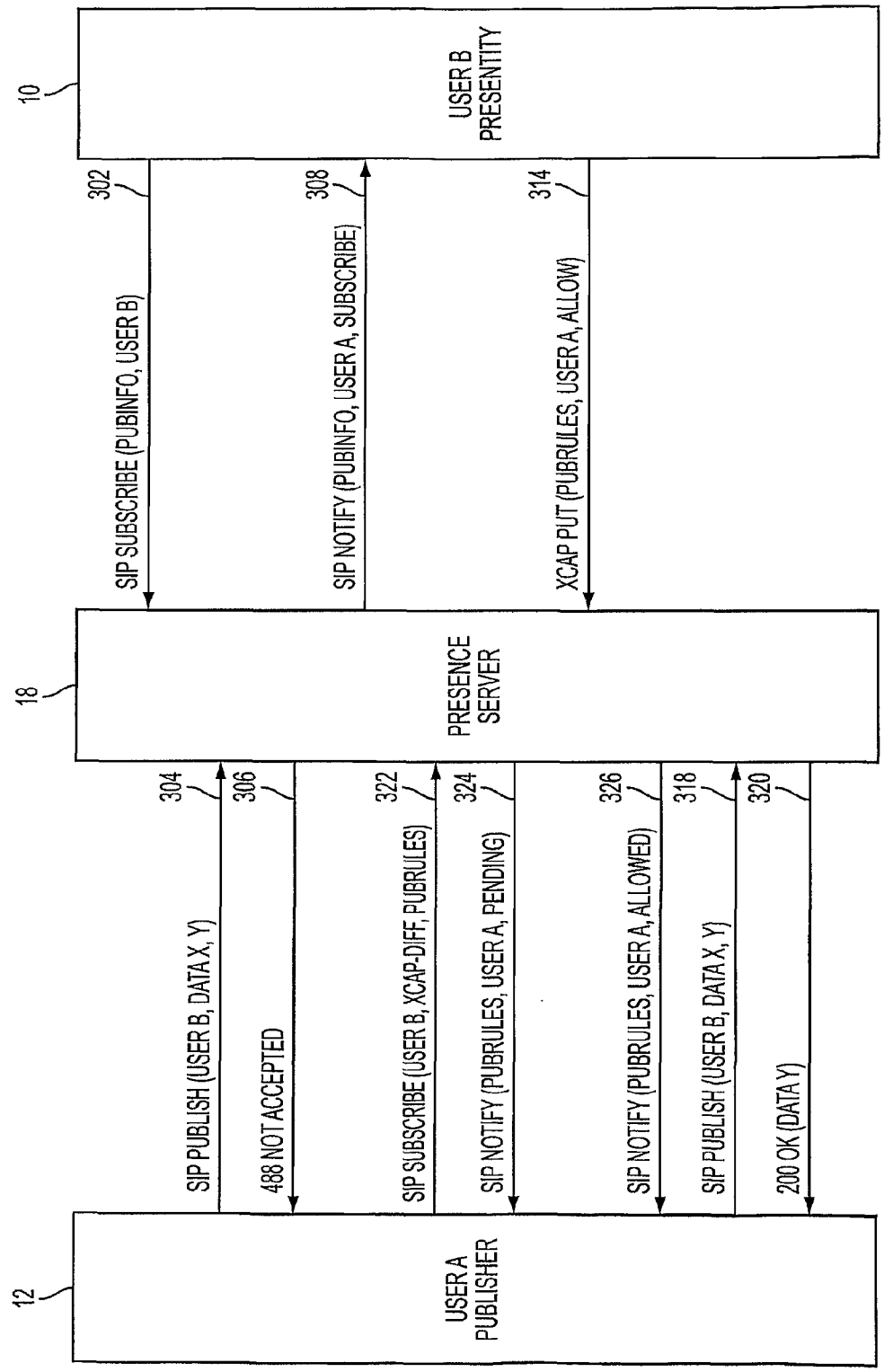

According to other exemplary embodiments, a publisher 12 subscribes to a pub-rule document stored in the Presence XDMS function 16 in the presence server 18 to obtain knowledge of the authorization decision(s) of the presentity 10 as shown in FIG. 3(b). Initially, presentity 10 subscribes to publication information and potentially submits publication information, as shown by SIP Subscribe message 302 from presentity 10 to the presence server 18. At some future point in time, publisher 12 sends a SIP Publish message 304, which includes information about the presentity 10 and data X, Y, to publish data X and Y on behalf of User B. Data X and Y can represent different content, associated with presentity 10, that publisher 12 desires to publish (or have published). Presence server 18 then reviews its publishing/authorization rules and determines, in this case, that no authorization rule(s) exist for publisher User A 12 and a message returning a form of a negative response, e.g., 488 Not Accepted message 306, is transmitted back to the publisher 12. It is expected that other types of negative response messages could be used here as desired. Additionally, at (or around) this time a SIP Notify message 308, which includes information associated with pubinfo and User A is transmitted from the presence server 18 to the User B presentity 10.

After receipt of the 488 Not Accepted message 306, the User A publisher 12 transmits a SIP Subscribe message 322 to the presence server 18 for subscription to XCAP changes of interest, e.g., changes in publishing rules from User B 10. In response to this message 322, the presence server 18 transmits a SIP Notify message 324 which informs the publisher 10 that publication authorization is pending. At some subsequent point in time, the presence server 18 receives an XCAP PUT message 314 which updates the publication rules for User A 12. The presence server 18 can then transmit another SIP Notify message 326 to the publisher 12 which includes notification of a publication rules update. The publisher 12 then transmits another SIP Publish message 318, which the presence server 18 compares to its stored publication rules, and responds to the publisher 12 with a 200 OK message 320 with the allowed publication result, in this case, the authorization to publish data Y on behalf of the presentity 10.

Figure 3C:
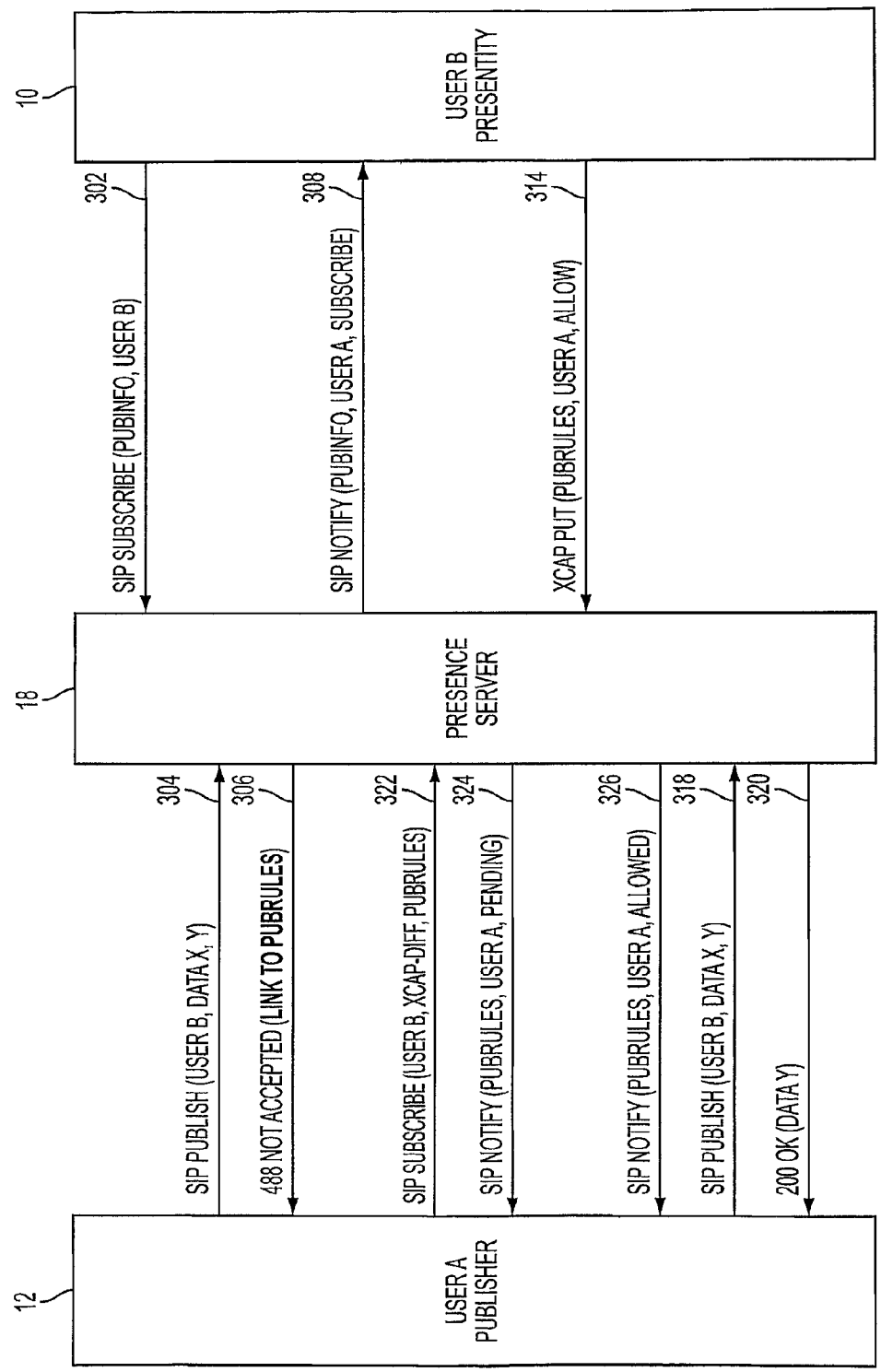

According to other exemplary embodiments, a publisher 12 subscribes to the pub-rule document stored in the Presence XDMS function 16 in the presence server 18 to obtain knowledge of the authorization decision(s) of the presentity 10 as well as obtaining a link to the pub-rule document as shown in FIG. 3(c). This exemplary embodiment is similar to that described above for FIG. 3(b). The difference between the signalling embodiments of FIG. 3(b) and FIG. 3(c) is in the 488 Not Accepted message 306. In this case, attached to this message 306 (in FIG. 3(c)) is a link to the pub-rule document stored in the presence XDMS 16 within the presence server 18 as an alternative (or additional) method for enabling the publisher 12 to obtain knowledge of the authorization decision by presentity 10. This link can also be sent via other channels or SIP messages.

Figure 4:
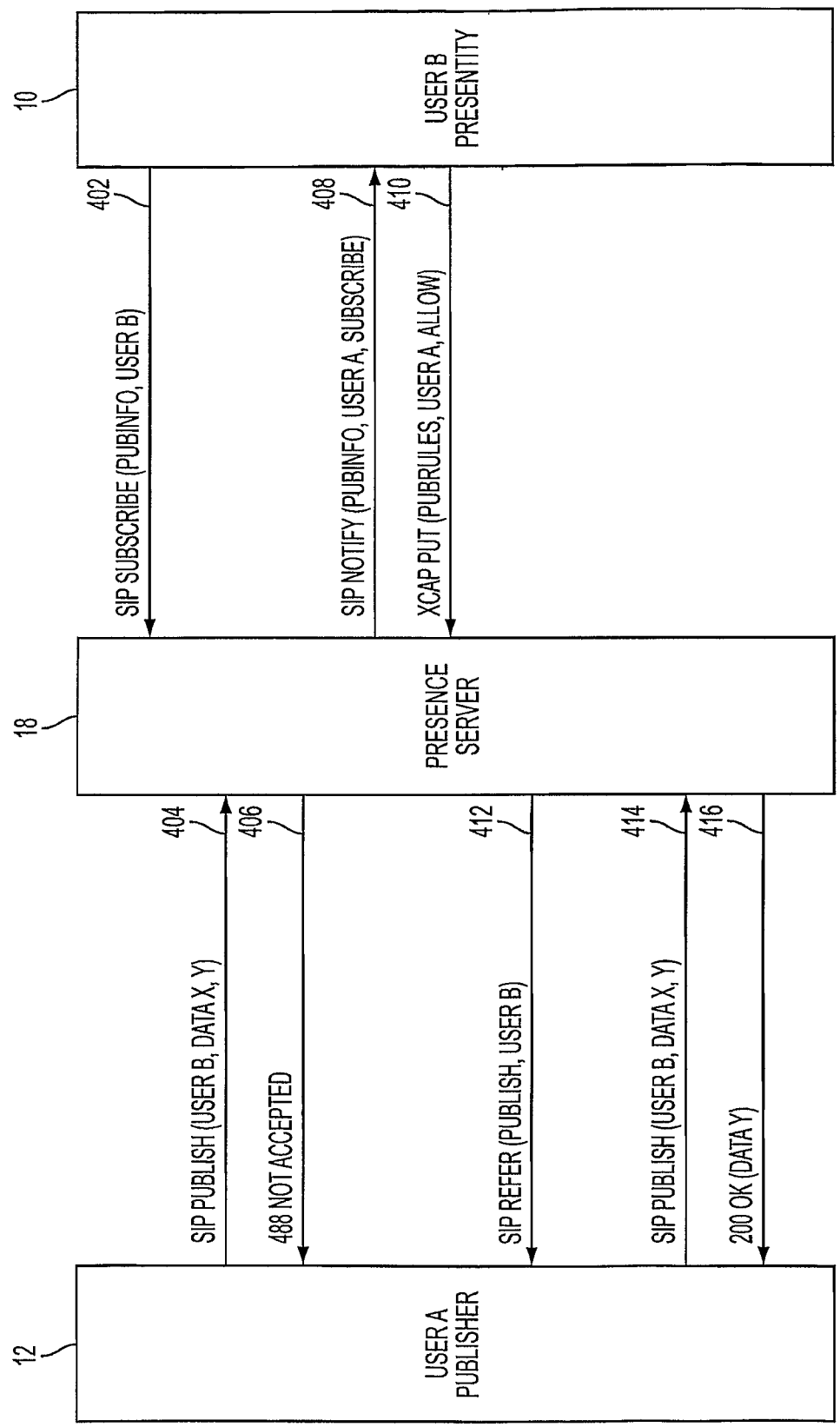
FIG. 4 illustrates a signalling diagram using a SIP Refer message for notifying a third party regarding publication authorization according to exemplary embodiments.

According to still further exemplary embodiments, a SIP Refer message can be used in the signalling process for notifying a third party that it is authorized to publish on behalf of another as shown in FIG. 4. Initially, presentity 10 subscribes to publication information and potentially submits publication information, as shown by SIP Subscribe message 402 from presentity 10 to the presence server 18. At some future point in time, publisher 12 sends a SIP Publish message 404, which includes information about User B presentity 10 and data X, Y, to publish data X and Y on behalf of User A, as well as, a Global Routable User Agent identifying the address of publisher User A 12. Data X and Y can represent different content, associated with presentity 10, that publisher 12 desires to publish (or have published). Presence server 18 then reviews its publishing/authorization rules and determines, in this case, that no authorization rule(s) exist for publisher 12 and a 488 Not Accepted message 406 is transmitted back to the publisher 12. Additionally, at this time a SIP Notify message 408, which includes information associated with pubinfo and User A is transmitted from the presence server 18 to the User B presentity 10.

After receipt of the SIP Notify message 408, the presentity 10 transmits an XCAP PUT message 410 which updates the publication rules for User A 12, e.g., allow data Y for publishing. The presence server 18 can then transmit a SIP Refer message 412 to the SIP user agent (UA) associated with publisher User A 12, indicating permission for publisher 12 to publish data associated with presentity User B 10. The publisher 12 then transmits another SIP Publish message 414, which the presence server 18 compares to its stored publication rules, and responds to the publisher 12 with a 200 OK message 416 with the allowed publication result, in this case, the authorization to publish data Y on behalf of the presentity 10.

Using the above described exemplary signalling diagrams a presentity 10 can determine and transmit publication rules regarding third party publishing, e.g., User A publisher 12, to a presence server 18. These publication rules can be expanded to include publishing rules for a plurality of third parties, publishing rules base upon content, publishing rules that require consent by the presentity per publishing request, publishing rules based upon content and various combinations of these potential publishing rules.

Additionally, according to exemplary embodiments, the concepts described by these signalling diagrams, e.g., FIGS. 2(a)-2(e), 3(a)-3(c) and FIG. 4, can be used for other concepts and protocols. For example, in an XCAP environment, the above described exemplary embodiments could be used to handle authorization of users that are allowed to change XCAP documents as well as other XCAP access rights. Additionally, these exemplary embodiments could be used to determine and control the publication of other presence attributes, as well as other parameters (both presence and non-presence related) such as the maximum number of publications allowed by a third party, the publication rate, size, etc.

According to exemplary embodiments, variations to the above described signalling diagrams can be made. For example, in certain cases a SIP Invite or a SIP Subscribe message can be used in place of the SIP Publish message to transmit the data stored by the presence server 18. Additionally, other types of signals can be used. For example, longer lived HTTP transactions can be used instead of the SIP Publish mechanism. This allows for an open HTTP session in which the presence server 18 will return the decision when the authorization has been decided. This alternative exemplary embodiment would remove the need for the publisher 12 to iteratively send SIP Publish messages to the presence server 18. Additionally, or alternatively, the presence server 18 could withhold its signaling toward the publisher 12 until after the presentity 10 has responded to an inquiry from the presence server regarding the publication request. According to alternative exemplary embodiments, if desired, the HTTP signalling can also be used in a manner similar to that of SIP signalling whereby a new request message does need to be transmitted.

According to exemplary embodiments, as described above, it is possible to determine which user(s), application(s), etc., are authorized to publish what information on behalf of another user and/or application. This allows for the increased usability for so called "content buddies" and groups where server users may publish to a single instance. Additionally, this can allow a moderator for a group to decide what data can and cannot be published in a real-time or near real-time environment.

Communication nodes that may act as a presentity, publisher, or an XDMS presence function/server in connection with the exemplary embodiments described above, may be desktop/personal computers, workstations, large-scale computing terminals, wireless terminals, or any other computing device capable of executing presence functions, e.g., awareness, publication and the like. The wireless terminals capable of publishing or having presence information which may be published, may include devices such as wireless/cellular telephones, personal digital assistants (PDAs), or other wireless handsets, as well as portable computing devices. The mobile terminals may utilize computing components to control and manage the conventional device activity as well as the functionality provided by the exemplary embodiments. Hardware, firmware, software or a combination thereof may be used to perform the various methods and techniques described herein.

Figure 5:
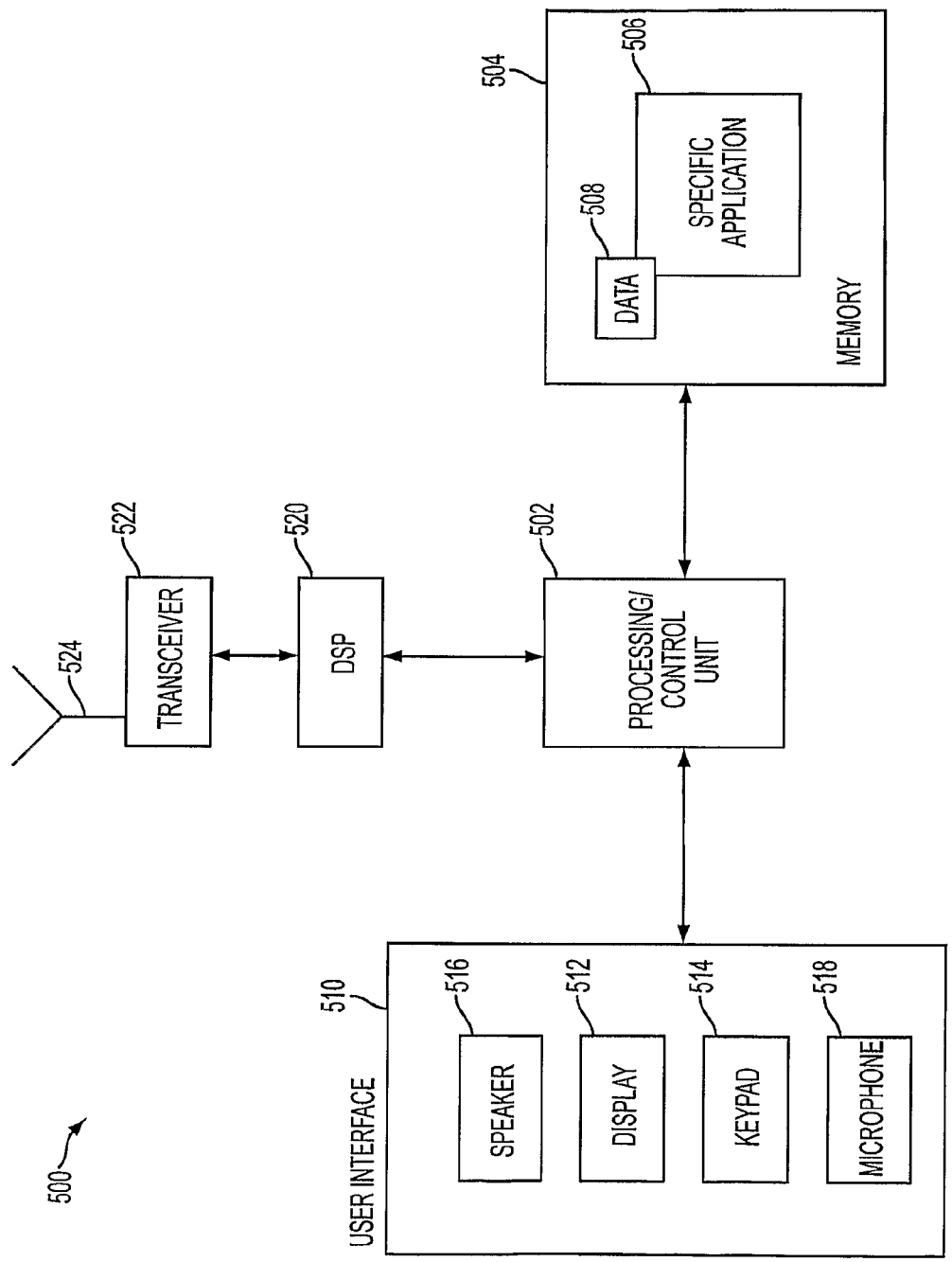
FIG. 5 depicts a representative mobile communication computing system according to exemplary embodiments.

For purposes of illustration and not of limitation, an example of a representative mobile communication computing system, e.g., a mobile communication unit acting as either a publisher 12 or a presentity 10, capable of carrying out operations in accordance with the exemplary embodiments is illustrated in FIG. 5. It should be recognized, however, that the principles of the exemplary embodiments described above are equally applicable to standard computing systems.

The exemplary mobile computing arrangement 500 may include a processing/control unit 502, such as a microprocessor, reduced instruction set computer (RISC), or other central processing module. The processing unit 502 need not be a single device, and may include one or more processors. For example, the processing unit 502 may include a master processor and associated slave processors coupled to communicate with the master processor.

The processing unit 502 may control the basic functions of the mobile terminal as dictated by programs available in the storage/memory 504. Thus the processing unit 502 may execute the functions described above with respect to the exemplary embodiments. More particularly, the storage/memory 504 may include an operating system and program modules for carrying out functions and applications on the mobile terminal (or other computing devices). For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the mobile computing arrangement 500 via data signals, such as those downloaded electronically via a network, e.g., the Internet.

One of the programs that may be stored in the storage/memory 504 is a specific application program 506. As previously described, the specific program 506 may interact with presence functions to support search request, authorization decisions and the like. The program 506 and associated features may be implemented in software and/or firmware operable by way of the processor 502. The program storage/memory may also be used to store data 508, such as various publication rules, or other data associated with the above described exemplary embodiments. In one exemplary embodiment, the programs 506 and data 508 are stored in non-volatile electrically erasable, programmable ROM (EEPROM), flash ROM, etc., so that the information is not lost upon power down of the mobile terminal.

The processor 502 may also be coupled to user interface 510 elements associated with the mobile terminal. The user interface 510 of the mobile terminal may include, for example, a display 512 such as a liquid crystal display, a keypad 514, speaker 516, and a microphone 518. These and other user interface components are coupled to the processor 502 as is known in the art. The keypad 514 may include alpha-numeric keys for performing a variety of functions, including dialing numbers and executing operations assigned to one or more keys. Alternatively, other user interface mechanisms may be employed, such as, voice commands, switches, touch pad/screen, graphical user interface using a pointing device, trackball, joystick, or any other user interface mechanism.

The mobile computing arrangement 500 may also include a digital signal processor (DSP) 520. The DSP 520 may perform a variety of functions, including analog-to-digital (A/D) conversion, digital-to-analog (D/A) conversion, speech coding/decoding, encryption/decryption, error detection and correction, bit stream translation, filtering, etc. The transceiver 522, generally coupled to an antenna 524, may transmit and received the radio signals associated with a wireless device.

The mobile computing arrangement 500 of FIG. 5 is provided as a representative example of a computing environment in which the principles of the exemplary embodiments described herein may be applied. From the description provided herein, those skilled in the art will appreciate that the present invention is equally applicable in a variety of other currently known and future mobile and fixed computing environments. For example, the specific application 506 and associated features, and data 508, may be stored in a variety of manners, may be operable on a variety of processing devices and may be operable in mobile devices having additional, fewer, or different supporting circuitry and user interface mechanisms. It is noted that the principles of the exemplary embodiments are equally applicable to non-mobile terminals, i.e., landline computing systems.

Figure 6:
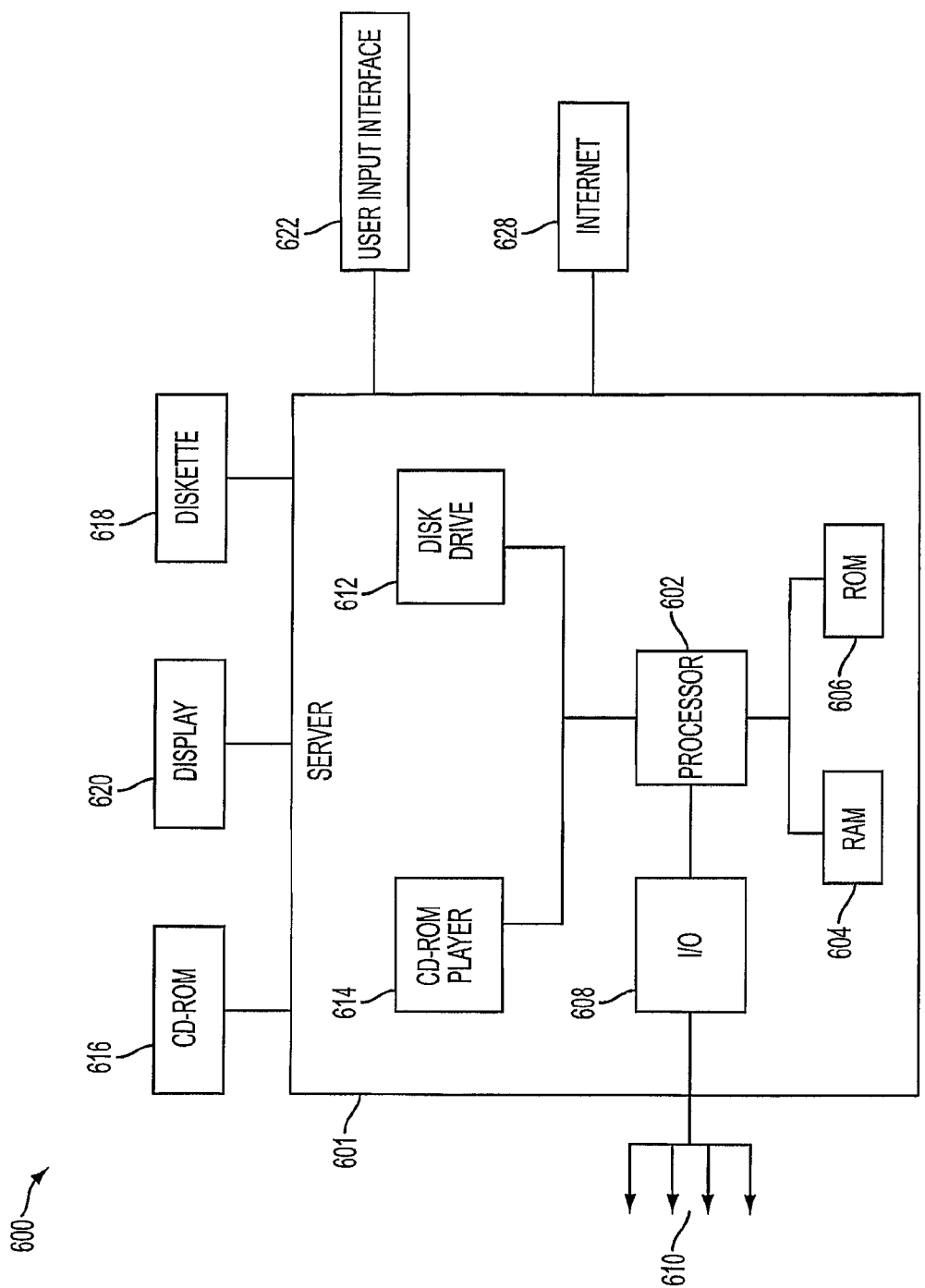
FIG. 6 shows a representative computing system according to exemplary embodiments.

The presence, publishing and/or presence XDMS servers or other systems for providing presence and publishing/authorizing information in connection with the above described embodiments, may be any type of computing device capable of processing and communicating presence information. An example of a representative computing system capable of carrying out operations in accordance with the servers of the exemplary embodiments is illustrated in FIG. 6. Hardware, firmware, software or a combination thereof may be used to perform the various steps and operations described herein. The computing structure 600 of FIG. 6 is an exemplary computing structure that may be used in connection with such a system.

The exemplary computing arrangement 600 suitable for performing the activities described in the exemplary embodiments may be a presence server or a publishing server or an XDMS server 601. Such a server 601 may include a central processor (CPU 602) coupled to a random access memory (RAM) 604 and to a read-only memory (ROM) 606. The ROM 606 may also be other types of storage media to store programs, such as programmable ROM (PROM), erasable PROM (EPROM), etc. The processor 602 may communicate with other internal and external components through input/output (I/O) circuitry 608 and bussing 610, i.e., collectively or individually a "communications interface", to provide control signals and the like. The processor 602 carries out a variety of functions as is known in the art, as dictated by software and/or firmware instructions.

The server 601 may also include one or more data storage devices, including hard and floppy disk drives 612, CD-ROM drives 614, and other hardware capable of reading and/or storing information such as DVD, etc. In one embodiment, software for carrying out the above discussed steps may be stored and distributed on a CD-ROM 616, diskette 618 or other form of media capable of portably storing information. These media may be inserted into, and read by, devices such as CD-ROM drive 614, the disk drive 612, etc. The server 601 may be coupled to a display 620, which may be any type of known display or presentation screen, such as LCD displays, plasma displays, cathode ray tubes (CRTs), etc. A user input interface 622 is provided, including one or more user interface mechanisms such as a mouse, keyboard, microphone, touch pad, touch screen, voice-recognition system, etc.

The server 601 may be coupled to other computing devices, such as the landline and/or wireless terminals and associated publishing requests/applications, via a network. The server may also be part of a larger network configuration as in a global area network (GAN) such as the Internet 628, which allows ultimate connection to the various landline and/or mobile client devices. Alternatively, the server 601 could be part of a single operator's communication network and be reserved for the use of its subscribers.

Figure 7:
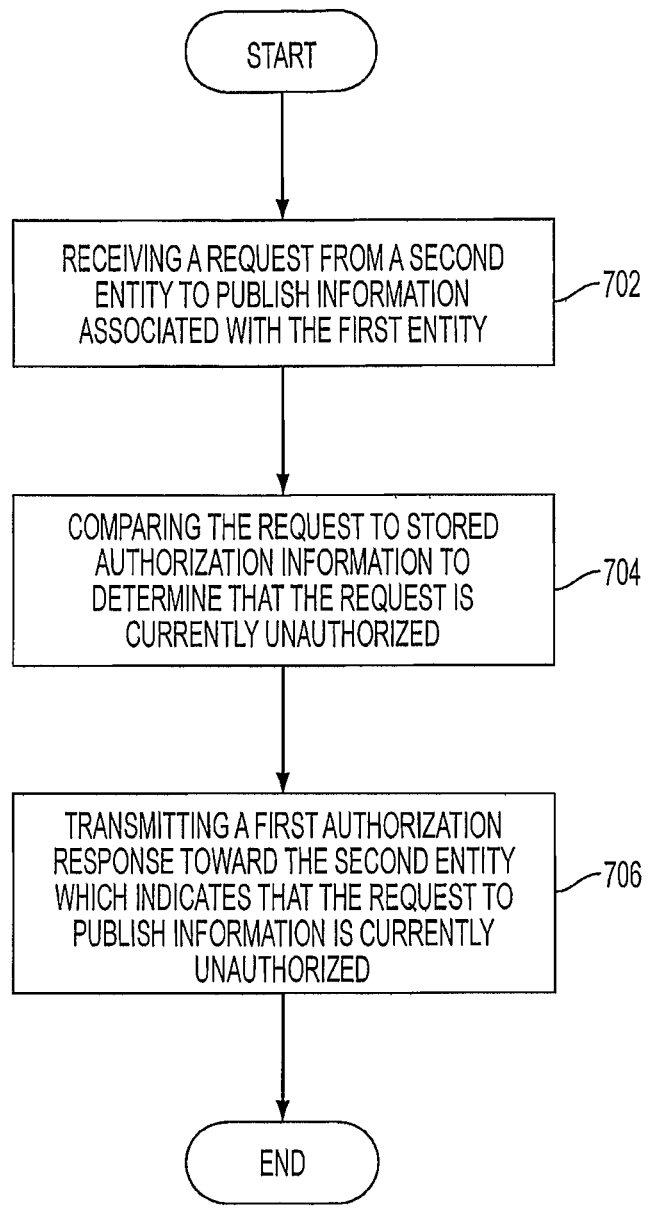
FIG. 7 is a method flowchart according to exemplary embodiments.

Utilizing the above-described exemplary embodiments, an exemplary method for handling unauthorized requests to publish information is shown in the flowchart of FIG. 7. Initially a method for handling unauthorized requests to publish information associated with a first entity includes: receiving a request from a second entity to publish information associated with the first entity in step 702; comparing the request to stored authorization information to determine that the request is currently unauthorized in step 704; and transmitting a first authorization response toward the second entity which indicates that the request to publish information is currently unauthorized in step 706.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for handling unauthorized requests to publish presence information associated with a first entity of a presentity comprising:
   receiving a publication request from a second entity on behalf of another user of application to publish the presence information associated with said first entity;
   comparing said publication request to authorization information pre-stored in memory associated with the publication to determine that said publication request is currently unauthorized; and
   transmitting a first authorization response toward said second entity which indicates that said publication request to publish information is currently unauthorized;
   transmitting a first notification message toward said first entity, wherein said first notification message includes information regarding said publication request from a second entity to publish the presence information associated with said first entity; and
   receiving instructions associated with said request from said second entity to publish information associated with said first entity to selectively allow or block said publication request based upon content of the publication information.

2. The method of claim 1, further comprising:
   receiving a second request from said second entity to publish said information associated with said first entity;
   comparing said request to stored authorization information to determine a second authorization response;
   transmitting said second authorization response toward said second entity; and
   publishing at least some of said information.

3. The method of claim 1, further comprising:
   transmitting a second authorization response toward said second entity, wherein said second authorization response is based upon said received instructions associated with said request from said second entity to publish said information associated with said first entity; and
   publishing said information.

4. The method of claim 1, further comprising:
   publishing at least some of said information.

5. The method of claim 1, further comprising:
   receiving a subscription request from said second entity;
   transmitting a second notification message toward said second entity, wherein said second notification message includes a publication authorization pending status;

receiving instructions, from said first entity, associated with said request from said second entity to publish said information; and transmitting a third notification message toward said second entity, wherein said third notification message includes a publication authorization allowed status.

6. The method of claim 5, wherein said subscription request is a request to subscribe to publication information in a presence server.

7. The method of claim 5, wherein said subscription request is a request to subscribe to publication rules in a presence server.

8. The method of claim 5, wherein said authorization response includes a link to publication rules.

9. The method of claim 1, wherein said received instructions are from said first entity and further comprising:

transmitting a SIP REFER message to said second entity;

receiving a second request from said second entity to publish said information associated with said first entity;

comparing said request to stored authorization information to determine a second authorization response; and transmitting said second authorization response toward said second entity.

10. The method of claim 1, wherein said step of transmitting a first authorization response toward said second entity which indicates that said request to publish information is currently unauthorized occurs before said first entity has responded to a request to authorize said request.

11. The method of claim 1, wherein said step of transmitting a first authorization response toward said second entity which indicates that said request to publish information is currently unauthorized occurs after said first entity has responded to a request to authorize said request.

12. A communications node for handling unauthorized requests to publish presence information associated with a first entity of a presentity comprising:

at least one memory for storing authorization information associated with publication;

a communications interface for transmitting and receiving messages including a publication request from a second entity on behalf of another user or application to publish the presence information associated with said first entity; and a processor, wherein said processor uses information stored in said memory to execute instructions in response to received messages and is configured to:

compare said request to said stored authorization information to determine that said publication request is currently unauthorized, wherein said communications interface also transmits a first authorization response toward said second entity which indicates that said publication request to publish the presence information is currently unauthorized and wherein said communications interface transmits a first notification message toward said first entity, wherein said first notification message includes information regarding said publication request from a second entity to publish the presence information associated with said first entity, and receives instructions associated with said request from said second entity to publish information associated with said first entity to selectively allow or block said publication request based upon content of the publication information.

13. The communications node of claim 12, wherein said communications interface receives a second request from said second entity to publish said information associated with said first entity and said processor is further configured to: compare said request to stored authorization information to determine a second authorization response, wherein said communications interface further transmits said second authorization response toward said second entity and publishes at least some of said information.

14. The communications node of claim 12, wherein said communications interface transmits a second authorization response toward said second entity, wherein said second authorization response is based upon said received instructions associated with said request from said second entity to publish said information associated with said first entity, and publishes said information.

15. The communications node of claim 12, wherein said communications interface publishes at least some of said information.

16. The communications node of claim 12, wherein said communications interface is further configured to:

receive a subscription request from said second entity;

transmit a second notification message toward said second entity, wherein said second notification message includes a publication authorization pending status;

receive instructions, from said first entity, associated with said request from said second entity to publish said information; and transmit a third notification message toward said second entity, wherein said third notification message includes a publication authorization allowed status.

17. The communications node of claim 16, wherein said subscription request is a request to subscribe to publication information in a presence server.

18. The communications node of claim 16, wherein said subscription request is a request to subscribe to publication rules in a presence server.

19. The communications node of claim 16, wherein said authorization response includes a link to publication rules.

20. The communications node of claim 12, wherein said received instructions are from said first entity and wherein said communications interface is further configured to:

transmit a SIP REFER message to said second entity;

receive a second request from said second entity to publish said information associated with said first entity;

compare said request to stored authorization information to determine a second authorization response; and transmit said second authorization response toward said second entity.

21. The communications node of claim 12, wherein said communications interface transmits said first authorization response toward said second entity which indicates that said request to publish information is currently unauthorized before said first entity has responded to a request to authorize said request.

22. The communications node of claim 12, wherein said communications interface transmits said first authorization response toward said second entity which indicates that said request to publish information is currently unauthorized after said first entity has responded to a request to authorize said request.

* * * * *

UNITED STATES PATENT AND TRADEMARK OFFICE
CERTIFICATE OF CORRECTION

| | | |
|---|---|---|
| PATENT NO. | : 8,719,906 B2 | Page 1 of 1 |
| APPLICATION NO. | : 13/321593 | |
| DATED | : May 6, 2014 | |
| INVENTOR(S) | : Boberg et al. | |

It is certified that error appears in the above-identified patent and that said Letters Patent is hereby corrected as shown below:

In the Specification

In Column 9, Lines 64-65, delete "publisher 10" and insert -- publisher 12 --, therefor.

In the Claims

In Column 14, Line 26, in Claim 1, delete "user of" and insert -- user or --, therefor.

Signed and Sealed this
Fifteenth Day of December, 2015

Michelle K. Lee
*Director of the United States Patent and Trademark Office*